UNITED STATES PATENT OFFICE.

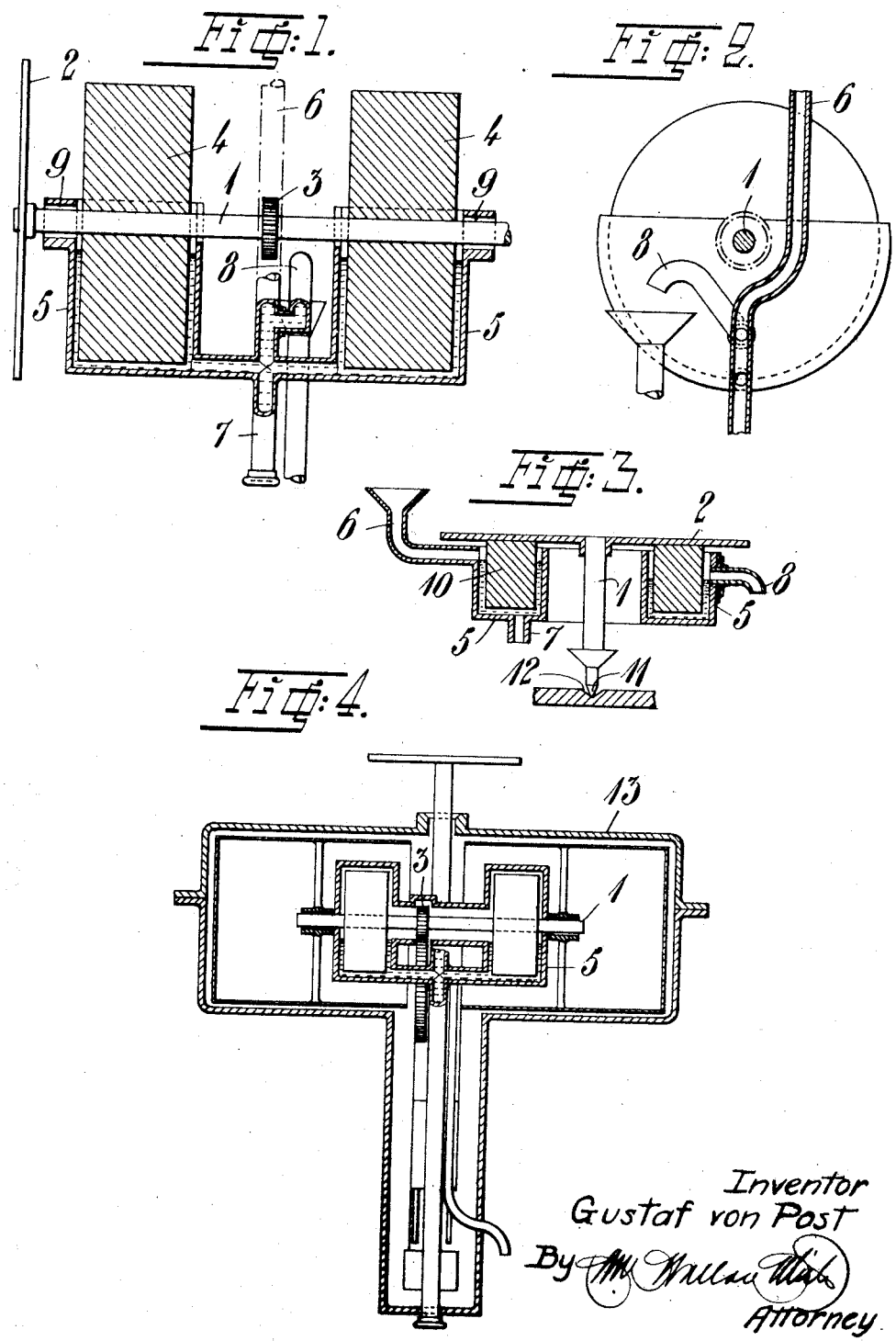

GUSTAF von POST, OF STOCKHOLM, SWEDEN.

PIVOTING DEVICE FOR ROTATING PARTS IN WEIGHING APPARATUS AND THE LIKE.

1,256,747.  Specification of Letters Patent.  Patented Feb. 19, 1918.

Application filed February 18, 1916. Serial No. 79,031.

*To all whom it may concern:*

Be it known that I, GUSTAF VON POST, a subject of the King of Sweden, residing at 3 Blasicholmsgatan, Stockholm, Sweden, have invented new and useful Improvements in Pivoting Devices for Rotating Parts in Weighing Apparatus and the like, of which the following is a specification.

In weighing and similar apparatus with rotating parts, where it is of importance for the sake of sensibility that the movements of said rotating parts occur under the smallest possible friction, efforts have been made to reduce the friction by various means. For instance, the pivots of the rotating parts have been mounted between rotary rollers of a comparatively large diameter. These and other means, however, are not satisfactory even for light parts, as indexes in index weighing apparatus, and still less for dials or index drums with comparatively large dimensions.

The object of the present invention is to provide a pivoting device which operates with a sufficiently small amount of friction for being apt to support such weighing parts. This device is principally characterized by the fact that the rotating parts are supported by mercury or another suitable fluid.

In the accompanying drawing, some forms of the invention are illustrated. Figure 1 shows a vertical section through a pivoting device for a vertical index dial in a dial weighing apparatus and Fig. 2 an end view of the same device. Fig. 3 shows a pivoting device for a horizontal dial. Fig. 4 shows a section through an index weighing apparatus with a pivoting device embodying the invention mounted therein.

In the form shown in Figs. 1 and 2, 1 is the shaft of an index dial 2. The shaft 1 is adapted to be rotated by a balance by means of a tooth wheel 3 and a tooth wheel or rack bar (not shown) coöperating therewith. Centrally on the shaft 1, there are mounted two rollers 4 which are surrounded to a certain height by vessels 5 communicating with each other, said vessels being adapted to be filled with mercury or another suitable fluid in such a quantity that the rollers will float freely in the vessels. The fluid is poured in through a pipe 6 and can be drawn off through a pipe 7 adapted to be closed. In addition to the pipes 6 and 7, the vessels have an overflow pipe 8 which is rotatably mounted in the pipe 6 so that its mouth can be adjusted to different height. By such adjustment the mercury level in the vessels 5 can be easily and exactly controlled at will. In the form shown, the shaft 1 traverses openings 9 in the walls of the vessels 5, said openings limiting the displacement of the shaft and the rollers in directions perpendicular to the shaft. In filling the vessels with mercury, the overflow pipe is so adjusted that the quantity of mercury in the vessels lifts the rollers to such an extent, that the shaft 1 is not in contact with the edges of the openings 9.

In the form shown in Fig. 3, the index dial 2 is horizontal and the shaft 1 vertical. Instead of rollers, an annular supporting body 10 is used in this instance. The vessel 5 is correspondingly annular and provided, as in Figs. 1 and 2, with a filling pipe 6, a draining pipe 7 adapted to be closed and an adjustable overflow pipe 8. The sidewise movements of the shaft 1 are limited by a conical pivot 11 which engages a corresponding recess 12 in some stationary part. In filling in mercury, the overflow pipe is so adjusted that the mercury in the vessel 5 will lift the pivot 11 out of contact with the bottom of the recess 12.

In the apparatus shown in Fig. 4, a pivoting device of substantially the same construction as that shown in Figs. 1 and 2 is mounted in the casing 13 of the apparatus.

Having now particularly described the nature of my invention and the manner of its operation, what I claim is:

1. In weighing and similar apparatus having rotating parts, a receptacle adapted to contain fluid to support said rotating parts, and regulating means for maintaining any one of a predetermined range of levels of the fluid.

2. In weighing and similar apparatus having rotating parts, a receptacle adapted to contain fluid to support said rotating parts, regulating means for maintaining any one of a predetermined range of levels of the fluid, and means for limiting the movement of the rotating parts away from a predetermined position.

3. In weighing and similar apparatus having rotating parts, a receptacle filled with fluid supporting said rotating parts, and an adjustable overflow outlet for said receptacle.

In testimony whereof I have signed my name to this specification in the presence of two subscribing witnesses.

GUSTAF von POST.

Witnesses:
 BIRGER NORDFELDT,
 ADA SIMON.

Copies of this patent may be obtained for five cents each, by addressing the "Commissioner of Patents, Washington, D. C."